United States Patent [19]

Krueger

[11] 4,078,962

[45] Mar. 14, 1978

[54] VACUUM PRESS

[75] Inventor: Theodore H. Krueger, Wayland, Mass.

[73] Assignee: Seal Incorporated, Naugatuck, Conn.

[21] Appl. No.: 739,054

[22] Filed: Nov. 5, 1976

[51] Int. Cl.[2] .......................................... B30B 15/34
[52] U.S. Cl. ............................... 156/497; 100/93 P; 100/211; 156/286; 156/583
[58] Field of Search ............... 156/286, 285, 382, 497, 156/580, 583, 475, 499; 355/91, 93, 94; 100/93 P, 211

[56] References Cited

U.S. PATENT DOCUMENTS

| | | | |
|---|---|---|---|
| 1,126,796 | 2/1915 | Levy | 355/94 |
| 2,620,289 | 12/1952 | Douglas | 156/286 |
| 3,463,587 | 8/1969 | Oltra et al. | 355/93 |
| 3,556,656 | 1/1971 | Evensen | 355/94 |
| 3,738,890 | 6/1973 | Johnson et al. | 156/286 |
| 3,818,823 | 6/1974 | Bond | 100/211 X |
| 3,950,210 | 4/1976 | Gibbs et al. | 100/93 P X |

*Primary Examiner*—William A. Powell
*Assistant Examiner*—M. G. Wityshyn

*Attorney, Agent, or Firm*—Schiller & Pandiscio

[57] ABSTRACT

The present invention constitutes a vacuum press for mounting and laminating graphic art objects such as photographs and the like. The press utilizes two pliable airtight membranes, a first membrane attached to and supported by a base frame and a second membrane positioned over the base frame, arranged to form an airtight chamber containing the workpiece. The second membrane is specifically chosen so as to have a contour-defining capability. Thus when the chamber is evacuated, exterior atmospheric pressure will collapse the chamber and compress the workpiece between the two membranes, and at the same time, the second membranes will image the upper surface contour of the workpiece so as to reveal any undesirable surface irregularities such as wrinkles or bubbles which might exist in the workpiece. This indication gives the operator an opportunity to remove the irregularities before mounting or laminating occurs. After the workpiece has been compressed, it is heated by one or more heating elements contained in the press to assist in bonding together the elements which make up the workpiece.

11 Claims, 8 Drawing Figures

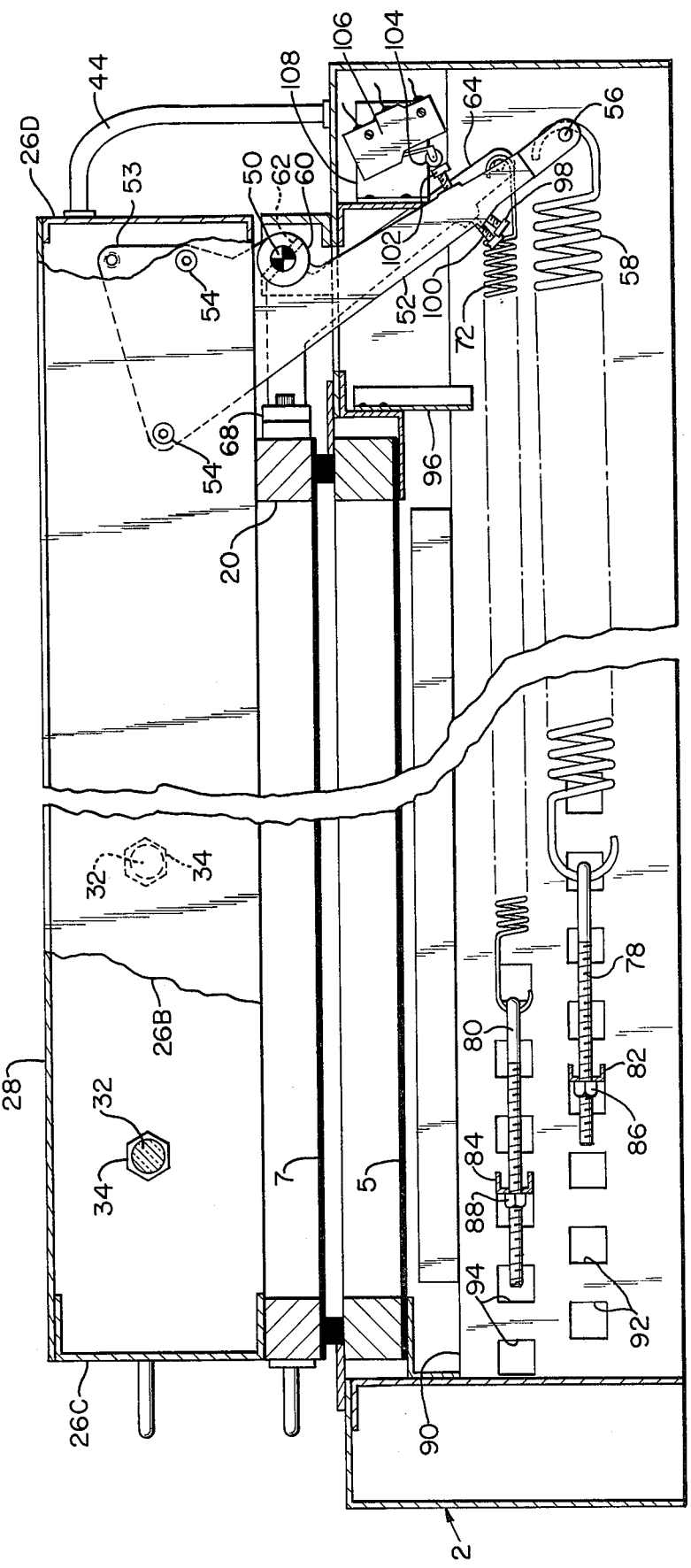

VACUUM PRESS

This invention relates to preparation of laminated articles and more particularly to presses for cohesively bonding together two or more sheets of selected materials by application of heat and pressure.

Heretofore several different types of apparatus have been provided for joining flexible or easily damaged graphic arts objects such as photographs, prints, charts, maps, printed documents and xerographic reproductions to other sheet materials to provide stiffness and tear-resistance and also to protect image surfaces. In the case of photographs, for example, substrates such as cardboard and foamed plastic panels are commonly joined to one side for stiffness, while adhesive coated transparent plastic films of materials such as Mylar ® are commonly joined to the front side for image protection. For convenience, in the graphic arts industry, the procedure of joining a photograph or similar object to a backing sheet is called "mounting" while the procedure of joining a transparent film to the front side of a photograph or like object is called "laminating". When the photograph or other graphic arts object is attached to a backing sheet or substrate by means of a tape or sheet coated on both sides with a hot melt adhesive, it is called "dry mounting".

One form of apparatus which has been available for carrying out dry mounting and laminating of graphic arts objects is a "vacuum press", so called because it makes use of the well known technique of generating the pressure required for bonding materials together under heat and pressure by pulling a vacuum in a contractable chamber containing the materials to be bonded. A vacuum press specially designed for laminating and dry mounting graphic arts media is described in U.S. Pat. Nos. 3738890, 3888719, 3950210, and 3951724. The press described in those patents comprises a base having an open horizontal frame, a flexible air-impermeable wall or membrane mounted on top of and extending across the open frame for supporting a workpiece, a platen assembly including a flat platen and means for heating the platen, means providing a hinged connection between the platen assembly and the base so that the platen assembly can be moved from a first raised or open position in which the upper surface of the flexible wall is exposed to view and a second lowered or closed position in which the platen overlies and conceals the flexible wall and forms a closed chamber in which the workpiece is contained, gasket means attached to the flexible wall where it is secured to the frame for providing an air-tight seal between the platen assembly and the flexible wall when the platen assembly is in its closed position, means for evacuating the closed chamber formed when the platen assembly is in closed position so as to cause the workpiece to be compressed between the flexible wall and the platen, and means for operating the evacuating means and the platen heating means so as to effect bonding of the components of the workpiece by heat and pressure. While they offer a number of advantages, vacuum presses made in accordance with the teachings of those patents require a rather long operating cycle. The term "operating cycle" is intended to denote the time which is consumed in evacuating the press and heating the various elements which make up the workpiece so as to activate the adhesive layers and cause the various elements to be bonded together. It has been determined from experience that there is a tendency with presses made in accordance with the foregoing presses to dehydrate the workpiece. As a consequence of the heating, the workpiece gives off moisture as a vapor which tends to reduce the vacuum, thereby necessitating a longer sucking action to withdraw moisture from the work and the press and also more heating to activate the adhesive. For a vacuum press measuring approximately 4 × 8 feet constructed in accordance with the foregoing patents, it has been determined that 20 or more minutes are frequently required to carry out a combined dry mounting and laminating operation in the manner described in U.S. Pat. No. 388719 where the workpiece measures between about 2-3 feet long on each side and consists of a substrate, a dry mount tissue, a photograph or other graphic arts object, and a transparent laminating film. A cycle time of 20 or more minutes is objectionable to users who are interested in maintaining a high rate of productivity. Additionally, the dehydration of the work may tend to reduce the stability or life of the graphic arts object particularly in the case where the graphic arts object is a colored photograph. In this connection it is to be noted that volatile solvents as well as moisture may be driven off when the workpiece is subjected to heat and reduced pressure, and release or removal of solvents may result in degradation of the graphic arts object. A futher limitation of prior art vacuum presses of the character described is that the operator cannot tell, except by inspecting the finished product, whether the laminating film is completely free of wrinkles and bubble-type irregularities due to air between the film and the graphic arts object when the workpiece is compressed. This limitation leads to a reduced yield of blemish-free laminations. The uncertainty as to whether the workpiece is free of wrinkles and other surface irregularities when the press is closed also tends to cause the operator to be extra careful in assembling the workpiece, with a consequent consumption of time.

Accordingly, the primary object of this invention is to provide a vacuum press which overcomes the dehydration, surface irregularities and time limitations of laminating and dry mounting operations carried out with vacuum presses made in accordance with the above-identified U.S. patents.

A more specific object is to provide a vacuum press wherein heat is not applied to the workpiece until after the chamber containing the workpiece has been evacuated to the extent required to compress the elements of the workpiece tightly against one another, whereby little or no moisture is evolved from the work during the evacuation period.

A further object of this invention is to provide a vacuum press which is designed so that pressurization of the workpiece and heating of the workpiece are carried out separately and sequentially.

Still another object of the invention is to provide a vacuum press wherein the heating may be conducted separately from the compression of the workpiece, with the heating being controllable so as to occur just long enough to activate the adhesives which form part of the workpiece.

A further object of the invention is to provide a vacuum press wherein it is possible to maintain the work under pressure even after the heating of the work has been terminated. Maintaining the work under pressure after heating has been terminated is advantageous in eliminating all danger of dehydrating the work.

Another important object is to provide a vacuum press which is designed so that it is possible to visually determine whether the compressed workpiece is free of wrinkles, bubbles and other surface irregularities before the workpiece has been heated.

According to the present invention, there is provided a vacuum press comprising a work support assembly including a base frame defining an opening and a first flexible air-impermeable lower sheet or membrane extending across the opening and secured to the base frame for supporting a workpiece, and a second upper membrane which is attached to a supporting member and is movable into covering relation with the first membrane so as to form an air-tight chamber in which the workpiece is disposed. The vacuum press further includes a second frame supporting one or more heating elements, and means joining the second frame to the base frame so that the heating elements can be moved into and out of heat-transmitting relation with the upper membrane. The upper membrane is selected so as to have a specific contour-defining or imaging capability. The press further includes means for evacuating the chamber formed by the two membranes so that the atmospheric pressure exterior of said chamber will force the membranes toward each other and thereby compress the workpiece contained within the chamber, and control means for operating the electrical heater means so that heat may be applied to the workpiece after the workpiece has been compressed by the two membranes. The contour-defining capability of the upper membrane facilitates examination of the workpiece after the evacuation step has been concluded so as to make certain that the lamellae of the workpiece are flat and free of wrinkles and intervening air bubbles.

Other features and advantages of the invention are set forth in or rendered obvious by the following detailed description of a preferred embodiment of the invention, which description is to be considered together with the accompanying drawings wherein:

FIGS. 6 and 7 are side elevations, partly in section, of the same press and show details of the mechanism for counterbalancing the assemblies which include the upper membrane and the heating elements; and FIG. 8 illustrates the control system for the press.

Figure 4:
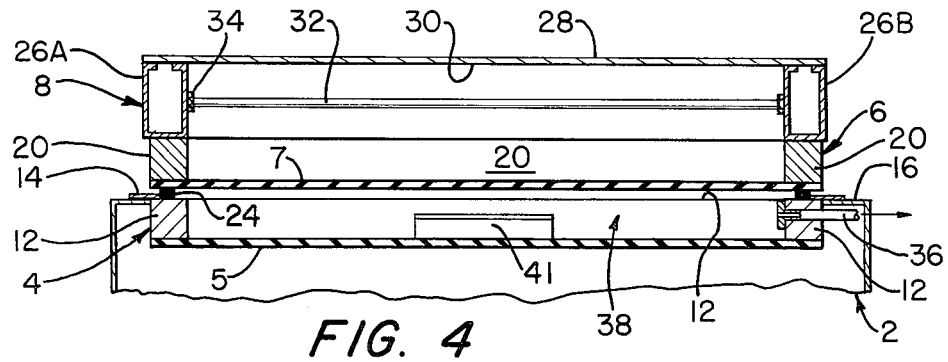
FIG. 4 is a cross-sectional view of the press of FIGS. 1-3 showing the upper membrane and the heating element assembly in lowered position but with the upper membrane separated from the first membrane.
Figure 5:
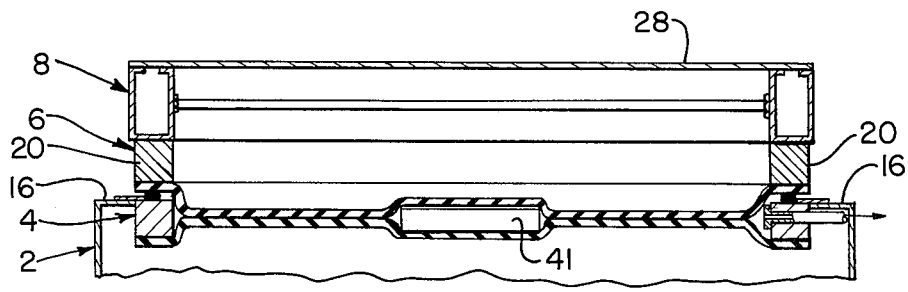
FIG. 5 is a view similar to FIG. 4 but showing the two membranes engaging one another and compressing a workpiece therebetween.

Turning now to FIGS. 1-5, the illustrated vacuum press comprises a self-supporting box-like base 2, a lower membrane assembly 4 which is carried by base 2 and includes a lower membrane 5, an upper membrane assembly 6 which is hinged to the base 2 and includes an upper membrane 7, and a heating element assembly 8 which also is hinged to the base 2. The base 2 may be supported by placing it on a table (not shown) or it may be provided with legs (not shown) so as to form a self-standing unit similar to the press disclosed in the U.S. Pat. No. 3738890. The box-like base 2 surrounds and forms a stable support for the frame of the lower membrane assembly 4. As shown in FIGS. 4 and 5, the lower membrane assembly may comprise a frame which consists of four rectangularly disposed frame members 12 which are secured to one another so as to form a rigid frame and are provided with flanges 14 which overlie and are secured to the flat upper surfaces 16 of the box-like base.

Attached to the bottom of the frame of membrane assembly 4 is the lower membrane 5 which is made of a flexible air-impermeable material and functions as a work-supporting wall or bed. The membrane 5 may be made of a natural or synthetic elastomer, e.g. a silicone rubber. It also may be a flexible plastic material or a rubber or plastic coated fabric. Preferably, membrane 5 is an elastic member which is capable of stretching, in which case the membrane may be made so that it extends substantially flat across the frame as shown when the press is open. However, it also is contemplated that the size of membrane 5, i.e., its length and width, may be large enough so as to permit it to slump to some extent like a catenary between frame members 12 when it is not drawn tight against the other membrane hereinafter described. In any event membrane 5 is made so that a major portion of it can be drawn into engagement with the upper membrane when the latter is in its down position.

The upper membrane assembly 6 comprises an open rectangular frame made up of four frame members 20 disposed in quadrilateral relationship. The members 20 form a substantially rigid frame and the frame is sized so as to generally correspond to the size of the frame of the lower membrane assembly. Attached to the underside of frame members 20 is the upper membrane or sheet 7 which is an elastomer and may be made of the same or a different material as membrane 5. Preferably membranes 5 and 7 are both made of a silicone rubber so that each will have both stretchability and adequate heat resistance. Preferably membrane 7 is made so that it extends substantially flat across its supporting frame as shown, but it may be sized to slump like a catenary to a limited extent depending upon the depth of the frame which supports membrane 5 and the stretchability and amount of slump of the latter membrane. Further details about membrane 7 are presented hereinafter. Attached to the underside of membrane 7 in registration with the frame members 20 is a resilient gasket 24 which preferably is made of a natural or synthetic elastomer, e.g., a silicone rubber, but also may be made of a resilient plastic material. The gasket 24 extends along the full perimeter of membrane 7 and serves as a sealing member as hereinafter described.

The second membrane 7 preferably is made so that it has the capability of defining or imaging the upper surface contour of the workpiece so as to reveal any undesirable surface irregularities such as wrinkles or bubbles which might exist in the workpiece. This capability is achieved by making the upper membrane of a material which is sufficiently flexible and thin to conform exactly to the contour of the workpiece when a vacuum is pulled between the closed chamber formed by the upper and lower membranes. Preferably, but not necessarily, the membrane is made with an imaging capability sufficiently good to permit the operator to see the outline of a strand of human hair which is placed between and squeezed tightly by the two membranes. This is achieved, for example, by making the upper membrane of an elastomer material, such as silicon rubber, which has a thickness in the range of about 0.030 to about 0.080 inch and is capable of stretching at least about 0.75 inch over a sheet length of about 24 inches when a vacuum is pulled in the closed chamber 38 formed when the upper membrane assembly is lowered into confronting relation with the lower membrane assembly. Preferably the upper membrane has a thickness of about 0.060 inch. While the upper membrane may be opaque, it is preferred that it be transparent or at least translucent, thereby making it easier to see the contour of the workpiece when the two membranes are drawn together.

The frame of the upper membrane assembly 6 may be hinged either to the base 2 or to the frame of the lower membrane assembly 4. The manner in which the frame of the upper membrane assembly frame is hinged to the base 2 or to the lower membrane assembly frame is not critical to the present invention and any one of several different hinge arrangements may be used without detracting from the advantages of the present invention. Preferably, however, the upper membrane assembly 6 is hinged to the lower membrane assembly frame by a mechanism which provides an effective counterbalancing force so as to facilitate its movement toward and away from the lower membrane assembly 4. One suitable hinge arrangement is described hereinafter in connection with FIGS. 6 and 7.

The heating element assembly 8 also preferably comprises an open rectangular frame made up of hollow side frame members 26A and B and front and back frame members 26C and D which are rigidly secured to one another in the same manner as frame members 20. A cover 28 overlies and is attached to the frame members 26, so that the upper heater assembly 8 essentially is open at the bottom and closed at the top. The cover panel 28 may be made of various materials, but preferably it is made of a metal such as aluminum which is a good heat conductor and is polished on its inner surface 30 so as to reflect heat toward upper membrane 7. The heater assembly 8 further includes a plurality of electrical radiant heating elements 32 of a suitable type, e.g. infrared heaters of the type comprising infrared heating elements contained in cylindrical quartz tubes. Ceramic coated electrical resistance heating rods also may be used. The heater elements are disposed parallel to each other and are attached to and extend between the side frame members 26A and B. The heater elements 32 may be mounted in openings in the frame members 26A and B but preferably they are mounted to bracket means 34 which are attached to the side frame members. Heater elements 32 are preferably spaced uniformly from one another, with the number and spacing of such elements being selected so as to provide a substantially uniform heating pattern. In other words, heating elements 32 are selected and mounted so that when the heater assembly 8 is moved down against the upper membrane assembly 6, the heat flux field established by the heaters will have little or no thermal gradients extending fore and aft and side to side with respect to upper membrane 7.

As shown in FIGS. 4 and 5, a pipe 36 is mounted in one of the frame members 12. The pipe 36 leads into the chamber 38 which is formed by the membranes 5 and 7 when the upper membrane assembly 6 is moved down into engagement with the lower membrane assembly 4. Pipe 36 is connected to a vacuum pump 40 (FIG. 8) and serves as a means for exhausting air from the chamber 38. When air is exhausted from chamber 38, the two membranes 5 and 7 are drawn together.

It is preferred that the vertical dimension of the frame members 20 and the position of the heater elements 32 with respect to the underside of frame members 26 be set so as to have a short distance, e.g., about 2-4 inches, between the heater elements and upper membrane 7 when the heater assembly is in its down position and the two membranes are sandwiched together to compress a selected workpiece 41 as shown in FIG. 5, whereby to reduce the amount of heat required to be radiated by the heater elements 32 and also the duration of heating, in order to properly heat the selected workpiece. The several electrical heating elements 32 are connected together in parallel and are coupled to the control panel 42 of the press by means of a flexible insulated cable 44 which leads out of the rear side of the heater assembly into the rear side of the box-like base 2.

Figure 6:
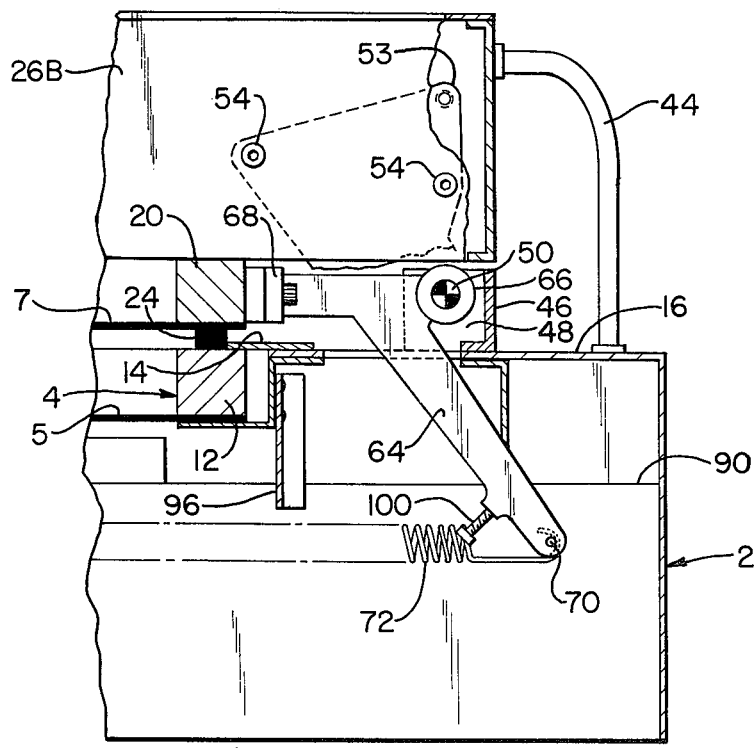

Turning now to FIGS. 6 and 7, a bar 46 is attached to the upper side of the box-like enclosure 2. Bar 46 has at least a pair of transverse webs 48 formed integral therewith between its ends and rotatably mounted in those webs is a shaft 50. As seen in FIG. 6, the upper end 53 of an arm 52 is attached to the inner side of the side frame member 26B of the heater assembly by means of screws at selected positions as indicated at 54. The lower end of arm 52 is provided with a pin 56 which serves as an anchor for the rear end of a tension spring 58. Intermediate its ends arm 52 has a cylindrical boss 60 through which extends shaft 50. Boss 60 is secured to shaft 50 by a pin 62 whereby shaft 50 will rotate with arm 52. Another arm 64 is disposed inwardly of arm 52 between the latter arm and one of the webs 48 of bar 46. Arm 64 has a cylindrical boss 66 which surrounds and is rotatable relative to shaft 50. Arm 64 is restrained against movement axially of shaft 50 by virtue of being sandwiched between arm 52 and the adjacent web 48. One end of arm 64 has a lateral extension 68 which is secured to the rear frame member 20 of the upper membrane assembly 6. The opposite end of arm 64 is provided with a pin 70 which serves as an anchor for the rear end of a second tension spring 72. Although not shown, it is to be understood that an additional pair of arms like arms 52 and 64 are correspondingly mounted on the opposite end of shaft 50 and connected respectively to the opposite side of frame member 26A and the opposite end of the rear frame member 20 of the upper membrane assembly, with additional springs 58 and 72 being correspondingly attached to pins 56 and 70 on the second pair of arms 52 and 64.

The forward ends of springs 58 and 72 are attached to eyebolts 78 and 80 respectively which pass through anchor members 82 and 84 repsectively and are fitted with nuts 86 and 88 respectively. Although only one partition is shown (FIG. 7), it is to be understood that the box-like base 2 has two interior partitions 90 which run from front to back and are located adjacent opposite side of the base. Each partition 90 has two series of spaced holes 92 and 94 and anchor members 82 and 84 are adapted to fit in holes 92 and 94 and interlock with the partitions so as to hold springs 58 and 72 under tension. The amount of tension in the springs can be adjusted by shifting the anchor members 82 and 84 from one to another of the holes 92 and 94 separately and also by changing the position of nuts 86 and 88 on eyebolts 78 and 80 respectively. In this connection it is to be noted that springs 58 and 72 are relaxed or under minimum tension when the heater assembly and the upper membrane assembly are raised (FIG. 1) and are stretched when those assemblies are lowered. Hence, the springs serve to assist the operator in raising the two assemblies. The upper position of the heater and upper membrane assemblies is determined by stop means which consists of a bar 96 (FIGS. 6 and 7) that is affixed to the base 2 just behind the lower membrane assembly in position to intercept and stop the two pairs of arms 52 and 64 when the two assemblies are raised. Arms 52 and 64 may be provided with extensions in the form of screws 98 and 100 which are received in tapped holes in the arms in position to engage bar 96, whereby turning the screws in and out permits the upper positions of the heater and upper membrane assemblies to be adjusted. Another screw 102 (FIG. 7) is similarly received in a tapped hole in arm 52. Screw 102 is disposed so that it will engage and actuate the operating member 104 of a normally off limit switch 106 when the heater assembly is moved down against the frame of the upper membrane assembly when the latter is down in its operating position (FIG. 7). Switch 106 forms part of the control system of FIG. 8 hereinafter described and is affixed to a bracket 108 that is carried by base 2.

The press also includes means for locking the upper membrane assembly in its down position. By way of example the locking means may comprise a pair of toggle latches 110 attached to the base and a pair of catches for engagement by the latches attached to the front frame member of the upper membrane assembly. The locking means is provided to avoid the need for the operator holding down the upper membrane assembly to make sure that chamber 38 is sealed off by gasket 24 so that a vacuum can be pulled between the two membranes. The lock means are not required once a vacuum has been pulled since the exterior atmospheric pressure will hold the two membrane assemblies tight against one another. Additional locking means (not shown) may be provided for locking the heater assembly in down position, but such means are not usually required since the weight of the heater assembly is enough to keep it down despite the counter force of springs 58.

Figure 1:
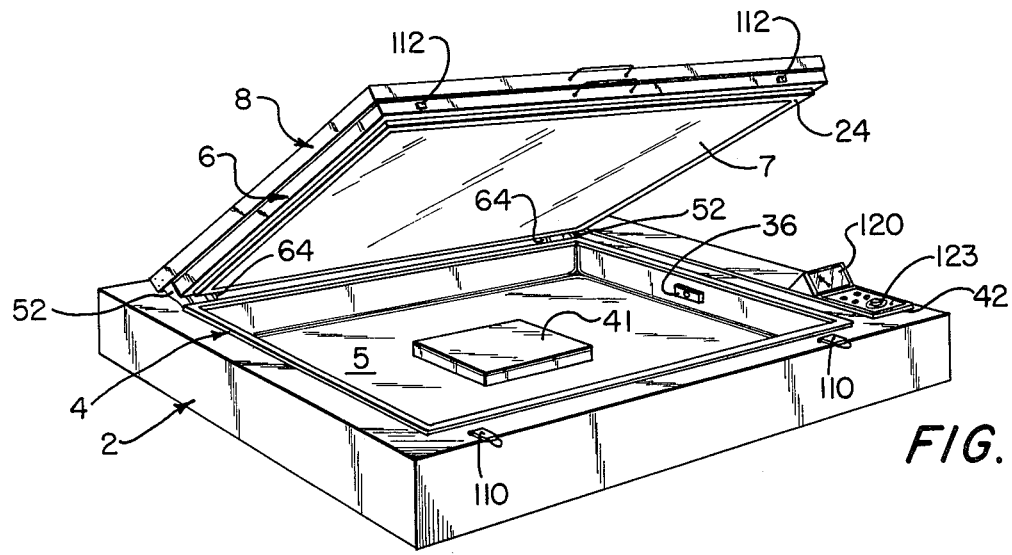
FIG. 1 is a perspective view of a vacuum press constructed in accordance with the present invention, with the heating element assembly and the upper membrane in raised position and a workpiece on the lower membrane.
Figure 2:
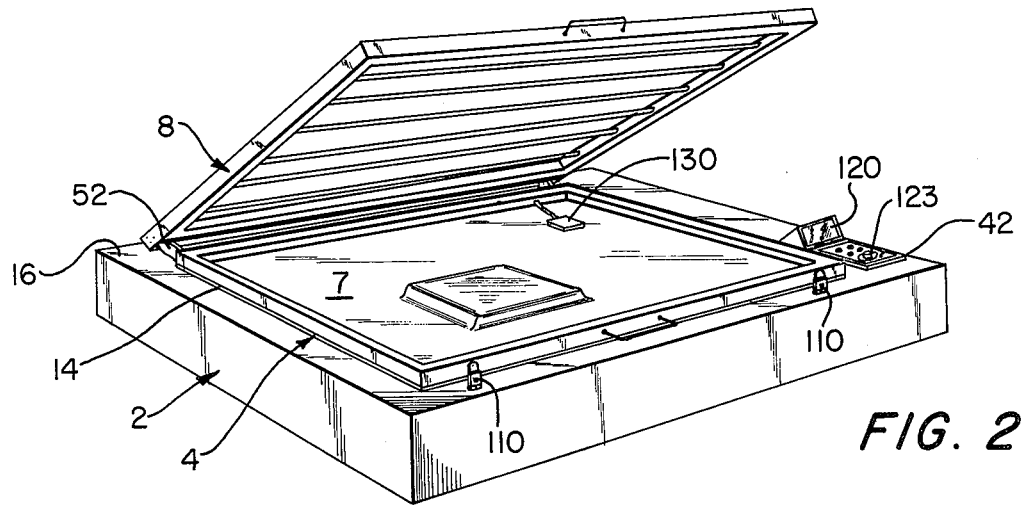
FIG. 2 is a perspective view like FIG. 1 showing the upper membrane in lowered position and with a workpiece compressed between the two membranes.
Figure 3:
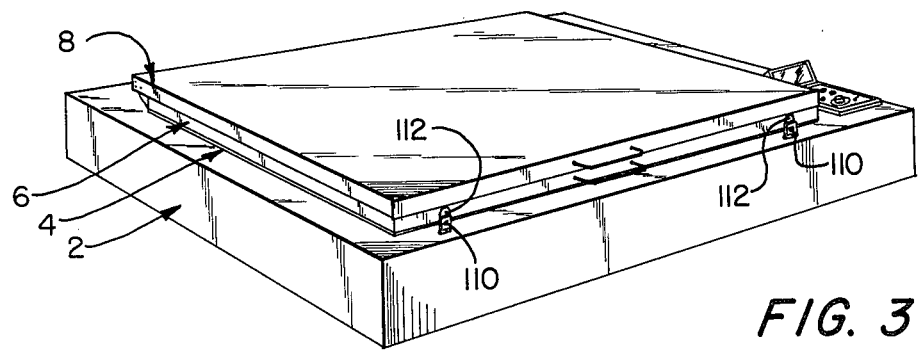
FIG. 3 is a perspective view showing the heating element assembly in lowered position adjacent to the upper membrane and the workpiece which is compressed between the two membranes.

FIG. 8 is a schematic diagram of one form of control system for the press. The control systems includes as part of control panel 42 an on-off toggle switch 114, second manually operated control switch 116, a red light 118, an amber light 119, a temperature gauge 120, and a timer 122. The latter is of the type which can be set to time out at any selected time within a predetermined time range by means of a rotatable know 123 (FIG. 1) and includes a set of normally open contacts 124 which close when the timer is actuated and reopen when the timer times out. Also forming part of the control system is vacuum pump 40 whose operating motor is controlled by switch 116, limit switch 106, a temperature controller 128 and a temperature sensor 130 which may be a mechanical thermostat or thermistor but preferably is a thermocouple and is attached to the upper side of upper membrane 7 as shown in FIG. 2. Temperature controller 128 may be of any suitable design provided it is capable of turning the heaters on and off in accordance with the temperature sensed by sensor 130 so as to maintain the temperature of the upper membrane at a predetermined level (the required operating temperature of the upper membrane will depend upon the nature and composition of the workpiece). In this case controller 128 is coupled to sensor 130 and is provided with a switch, represented as a pair of relay contacts 132, which is normally closed but will open when the temperature of the upper membrane sensed by the sensor reaches the aforesaid predetermined level. By way of example, the invention may be practiced using controllers similar to the ones disclosed by J. Markus, Electronic Circuits Manual, pages 818 (SCR Control For Relay), 823 (240-W Heater Control), 824 (Bath Control), 826 (Oven Control, 828 (3600 W IC Heater Control), 835 (Temperature-operated Relay), 836 (Precision On-Off Control) and 837 (On-off Triac Triggering Control), McGraw Hill 1971.

As will be obvious to a person skilled in the art, switch 116 allows vacuum pump 40 to be operated independently of heaters 32 and the latter will be turned on automatically together with timer 122 when the heater assembly is lowered far enough to close limit switch 106. Heaters 32 will turn off automatically when the heater assembly is raised. The timer may be arranged so that when switch 106 is opened it will continue to time out and then reset itself or else it may be arranged to reset itself as soon as switch 106 is opened. Although not shown, it is to be understood also that the vacuum pump system is arranged so that when the vacuum pump is stopped, the outlet port 36 will be connected to the atmosphere so as to break the vacuum and thus release the upper membrane from the lower membrane.

A press made as above described offers the advantages of simplicity and ease of operation, as well as overcoming the problems which have been encountered in the operation of presses of the type described in U.S. Pat. No. 3738890. The important thing is that the heating of the workpiece may be conducted after the workpiece has been fully compressed between the two membranes. A further advantage is that the use of a thin membrane having the ability to image the contour of the workpiece as herein described enables the operator to determine, before any application of heating, whether or not wrinkles exist in any portion of the workpiece. Thus, the operator avoids the production of products which are characterized by wrinkles and/or bubbles. Other advantages will be obvious to persons skilled in the art.

It is to be appreciated further that the invention is capable of being modified without departing from the basic concepts described herein. Thus the lower membrane may be made of a non-elastic material while the upper membrane may be made of an elastic material. Similarly the radiant heaters may be replaced by a flat platen which is electrically heated in the manner described in U.S. Pat. No. 3738890, the only difference being that the platen in this case is not used to compress the workpiece by merely to serve as a heat radiating surface. Other modifications will be obvious to persons skilled in the art.

What is claimed is:

1. A vacuum press comprising:
   a work support assembly including a first frame defining an opening and a pliable, air-tight first membrane secured to and supported by said first frame at its edges, said first membrane extending fully across said opening;
   a second membrane, said second membrane being thin, resilient, pliable and air-tight with the capability of imaging the contour of a workpiece when the membrane is drawn tight over the workpiece so as to permit visual inspection to determine whether the workpiece is free of surface irregularities;

a top frame assembly comprising a second frame and at least one heating element mounted to said second frame;

means for mounting said second membrane so that said second membrane is movable independently of said second frame into and out of covering relation with said first membrane, said second membrane cooperating with said first membrane to form a closed chamber for containing a workpiece when the second membrane overlies and is adjacent to the first membrane;

means mounting said top frame assembly so that said at least one heating element may be moved into and out of overlying and adjacent relation to said second membrane;

means for evacuating the closed chamber formed by said first and second membranes so that atmospheric pressure exterior of said chamber will force said membranes toward one another tight enough to compress any workpiece supported on said first membrane and so that the upper surface topography of the workpiece is imaged by said second membrane; and means for energizing said at least one heating element; said means for evacuating and said means for energizing being independently operable so that heat may be applied to said workpiece after said workpiece has been compressed by said first and second membranes.

2. A vacuum press according to claim 1 further including a third frame surrounding and supporting said second membrane, said second membrane drooping between the edges of said third frame.

3. A vacuum press according to claim 2 further including means pivotally mounting said third frame to said first frame.

4. A press according to claim 3 further including means pivotally connecting said second frame to said first frame.

5. A vacuum press according to claim 1 wherein said second membrane is made of a silicon rubber and has a thickness in the order of about 0.060 inch.

6. A vacuum press according to claim 1 further including a third frame defining an opening with said second membrane being attached to said third frame and extending fully across the opening defined by said third frame, and further wherein said third frame is sized so as to overlie and engage said first frame along the entire perimeter of said first membrane.

7. A press according to claim 6 further including means for forming a seal between said first frame and said third frame when said second membrane overlies and is adjacent to said first membrane.

8. A press according to claim 7 wherein said sealing means comprises a gasket carried by said third frame and extending along the full perimeter of said second membrane.

9. A vacuum press according to claim 1 further including means for supporting said first frame.

10. A vacuum press according to claim 1 wherein said second membrane is supported by a third frame which is movable into and out of confronting relation with said first frame, and means for latching said third frame to said first frame so as to maintain said second membrane in overlying relation with said first membrane.

11. A vacuum press according to claim 1 wherein said second membrane is elastic.

* * * * *